United States Patent [19]
Birbara et al.

[11] 4,452,676
[45] Jun. 5, 1984

[54] CARBON DIOXIDE CONVERSION SYSTEM FOR OXYGEN RECOVERY

[75] Inventors: Philip J. Birbara, Windsor Locks; Francis S. Galasso, Manchester; Richard D. Veltri, East Hartford, all of Conn.

[73] Assignee: United Technologies Corporation, Hartford, Conn.

[21] Appl. No.: 373,768

[22] Filed: Apr. 30, 1982

[51] Int. Cl.$^3$ .............................................. C25B 1/04
[52] U.S. Cl. .................................... 204/129; 423/458
[58] Field of Search ......................... 423/458; 204/129

[56] References Cited

U.S. PATENT DOCUMENTS

| | | | |
|---|---|---|---|
| 2,885,267 | 5/1959 | Buchmann et al. | 23/212 |
| 3,079,237 | 2/1963 | Taylor | 204/129 |
| 3,355,248 | 11/1967 | Hayes | 23/209.5 |
| 3,791,847 | 2/1974 | Araki et al. | 423/458 |
| 3,851,048 | 11/1974 | Araki et al. | 423/458 |
| 4,057,396 | 11/1977 | Matovich | 23/252 R |

Primary Examiner—R. L. Andrews
Attorney, Agent, or Firm—Harry J. Gwinnell

[57] ABSTRACT

A process for recovering oxygen from carbon dioxide is disclosed which is an improvement over the conventional process of utilizing an iron carbide catalyst in such reclamation process. As with the conventional processes the carbon dioxide is reacted with hydrogen to form a mixture of methane and water. The methane produced is then passed over a high temperature stable glass surface heated to about 1000° C.–1200° C. to produce hydrogen gas and a high density carbon, i.e. having a density greater than about 2 grams per cubic centimeter. This results in lessening of the storage problem for the carbon material because of its high density. The hydrogen gas produced is also recycled back to the incoming carbon dioxide for reaction.

5 Claims, 2 Drawing Figures

CARBON DIOXIDE CONVERSION SYSTEM FOR OXYGEN RECOVERY

CROSS-REFERENCE TO RELATED APPLICATION

Copending application Ser. No. 373,767 entitled "Method of Producing High Density Carbon", commonly assigned, by the same applicants, and filed on even date herewith, is incorporated by reference.

DESCRIPTION

1. Technical Field

The field of art to which this invention pertains is gas reclamation and carbon formation, and particularly, continuously running integrated systems of such type.

2. Background Art

In many environments it is necessary to reclaim oxygen from exhaled carbon dioxide of mammals, for example in a submarine or spacecraft environment. Such reclamation is generally accomplished by passing the carbon dioxide laden air through a carbon dioxide concentrator and then transferring the concentrated carbon dioxide to a carbon dioxide reduction system. A number of carbon dioxide reduction processes have been used, including both chemical and electrochemical means. Presently the Sabatier and Bosch processes are favored for use in conjunction with water electrolysis. Although the Sabatier reaction ($CO_2 + 4H_2 \rightarrow 2H_2O + CH_4$) results in simpler hardware implementation, the four to one hydrogen to carbon dioxide molar ratio required is in excess of the hydrogen to carbon dioxide molar ratio available in typical environments (such as spacecraft where the ratio is about 2.6 to 1) and therefore results in unreacted carbon dioxide.

Carbon dioxide reduction techniques such as the Bosch process provide a set of sequential reactions with a more favorable equilibrium for eventual oxygen recovery from carbon dioxide. Hydrogen from the oxygen generation system can be combined with the carbon dioxide in the carbon dioxide reduction system to produce water and solid carbon. The water is then transferred to the oxygen generation system wherein it is electrolyzed to produce oxygen for the crew and hydrogen for the carbon dioxide reduction system, thus completing the oxygen recovery cycle.

As presently developed the Bosch system requires the use of an expendable iron catalyst that operates at 700° C. Solid carbon with a low packing density of about 0.5 gram per cubic centimeter is deposited on the catalyst. The activity of the initial iron catalyst, usually in the form of steel wool, increases after carbon deposition occurs. The reason for this condition appears to be that the iron containing carbon contains more active iron and/or iron carbide ingredients.

Even with this system there are problems, however. Product carbon management presents serious problems in this Bosch process scheme. Carbon reacts with the iron catalyst forming iron carbides which migrate through the product carbon mass. This presents a difficult problem in separating carbon from catalyst resulting in consumption of the catalyst requiring additional expendable catalyst material. The carbon is deposited as a solid of low packing density (0.5 gram per cubic centimeter) causing a large storage problem. Because of the high temperatures involved, problem contaminants such as carbon monoxide, carbon dioxide, methane and hydrogen must be handled.

Accordingly, what is needed in this art is a process for reclaiming oxygen from carbon dioxide, which overcomes the problems described above.

DISCLOSURE OF INVENTION

The present invention is directed to an improvement in the conventional method of reclaiming oxygen from carbon dioxide exhaust by reacting the carbon dioxide with hydrogen to form a mixture of methane and water and electrolyzing the water to form hydrogen gas and oxygen. This method is improved by passing the methane produced over a high temperature stable glass surface which is heated to a temperature of about 1000° to about 1200° C. to produce hydrogen gas for reacting with the carbon dioxide and also producing a carbon deposit having a density greater than about 2 grams per cubic centimeter. Such method has the advantages of eliminating the large quantities of carbon monoxide of conventional Bosch systems, producing a much higher density carbon requiring a smaller storage volume, and eliminating expendable catalyst material which might be poisoned or otherwise need replacement.

The foregoing and other features and advantages of the present invention will become more apparent from the following description and accompanying drawings.

BEST MODE FOR CARRYING OUT THE INVENTION

The carbon dioxide conversion system for reclaiming oxygen is shown by reference to the figures. As shown therein, the process is a two-step process resulting in the overall production of a high density carbon and water which may be dissociated to provide oxygen. The carbon dioxide is hydrogenated over a hydrogenation catalyst (such as Hamilton Standard UASC 151G—20% by weight ruthenium on alumina granules) in the initial reactor 1 to form methane and water as described by the exothermic reaction: $CO_2 + 4H_2 \rightarrow CH_4 + 2H_2O$. Processed gas leaving the initial reactor is cooled, the water vapor produced in the reaction condensed and separated in a conventional condenser/separator 2 (note, for space travel applications a porous plate condenser/separator is preferred). Air from the cabin environment can be utilized to effect the water vaper condensation. The non-condensable methane containing gas stream is then directed to a regenerative heat exchanger 3 where it is heated prior to entering the second stage.

In the second stage reactor 4 the methane is decomposed to dense carbon (greater than 2 gm/cc) and hydrogen over a smooth non-catalytic glass surface at about 1000° C. to about 1200° C. by the following endothermic reaction: $CH_4 \rightarrow C + 2H_2$. The hydrogen produced in this reaction is then added to the hydrogen feed stream which enters at approximately 2.2–2.8 molar ratio of hydrogen gas to carbon dioxide. This results in an overall reactant stream molar ratio of 4.2–4.8. This molar ratio of hydrogen to carbon dioxide insures all the entering carbon dioxide will be reacted to completion.

The glass surfaces utilized for decomposing and collecting the high density carbon can be any high temperature stable glass which does not soften or deform at the 1000° C. to 1200° C. temperatures used in the present invention. Exemplary high temperature glasses are quartz and high silica content glass (such as Vycor ® glass) available from Corning Glass Works, Corning, N.Y. The glass can be used in the form of solid rods, plates, or hollow tubes or cylinders. The carbon deposited on the glass surfaces can be removed simply by tapping the glass on a solid surface and slipping the dense formed carbon off.

Heating can be provided to the system by any conventional means, although resistance furnace heating is preferred. An exemplary resistance furnace setup includes the use of standard firebrick and Globar silicon carbide rods available from Norton Company, Worcester, Mass. If a conventional resistance heater is used, the coils are wrapped around the glass chamber or other heating chamber containing the glass rods or tubes and sufficient current supplied to the resistance heater from any conventional power source to produce the desired temperature.

Figure 2:
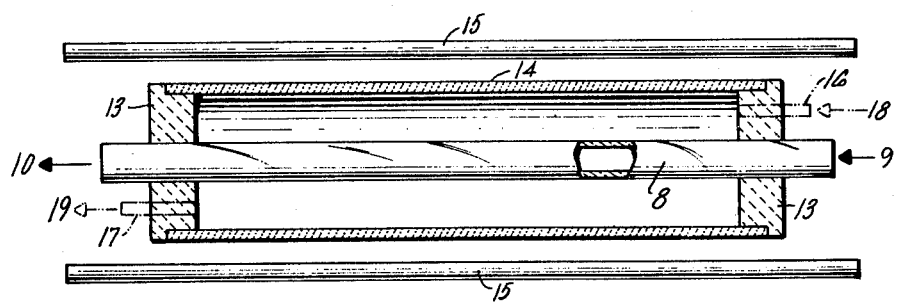
FIG. 2 shows typical apparatus for the high density carbon formation portion of the present invention.

A resistance furnace heated arrangement is shown by FIG. 2 where the glass tube 9 is inserted between conventional firebrick seals 13 and surrounded by an alumina muffle 14. Two of the six Globar silicon carbide rods 15 as described above with a 9 inch active heating element are shown placed around the alumina muffle and the entire unit encased in a standard firebrick enclosure. If the carbon deposition is to take place on the inside of the glass tube, the methane will enter as indicated by arrow 9 and the hydrogen gas exhausted as indicated by arrow 10. However, if deposition is desired on the outside of the glass tube, channels 16 and 17 as indicated by the broken lines would be provided through the firebrick seals to allow for entry of the methane gas 18 and exit of the hydrogen gas exhaust 19.

Although temperatures higher than about 1200° C. can be used for the deposition, for both energy efficiency and overall system stability considerations temperatures above 1200° C. are undesirable. And the fact that no catalyst is used at this stage lessens concern about tolerance to impurities. For example, methane saturated with water vapor can still be processed to the high density carbon and hydrogen gas according to the present invention.

The amount of methane flowed through the glass or over the glass depends on the surface area of the glass and the temperatures involved. Flow rates of 10 cc per minute to 1300 cc per minute for temperatures ranging from 1000° C.–1200° C. can be used to deposit the high density carbon on the outside of glass rods or tubes or the inside of glass tubes having diameters ranging from 3 millimeters to 30 millimeters. A preferred arrangement is deposition on the inner surface of a 22 millimeter hollow glass tube at a methane flow rate of 50 cc per minute at a temperature of 1200° C. The methane is generally run through the system between atmospheric pressure and 6 psi above atmosphere pressure. While it is preferred to use laminar flow when supplying the methane to the glass tubes in reactor 4 it is believed that turbulent flow will also work with the present invention.

EXAMPLE

A deposition furnace was assembled utilizing a resistance heater (note FIG. 3). The furnace employed six 1.25 cm diameter by 46 cm long silicon carbide resistance rod heaters arranged in a circle around a 7 cm diameter by 50 cm long alumina tube. Methane was passed through a silica tube suspended within the aluminum muffle. A platinum/platinum-rhodium thermocouple was used to measure the temperature of the silica tube. Since the internal diameter of the alumina tube was greater than 5 cm, a 25 millimeter inner diameter by 28 millimeter outer diameter silica tube was first placed within this furnace. A 5½ hr. run at 1200° C. with a methane flow rate of 100 cc per minute produced dense deposited carbon with a density greater than 2 gm/cc. A similar run for 2.8 hrs. with a methane flow rate of 40 cc per minute also resulted in high density (greater than 2 gm/cc) deposited carbon layers.

Figure 1:
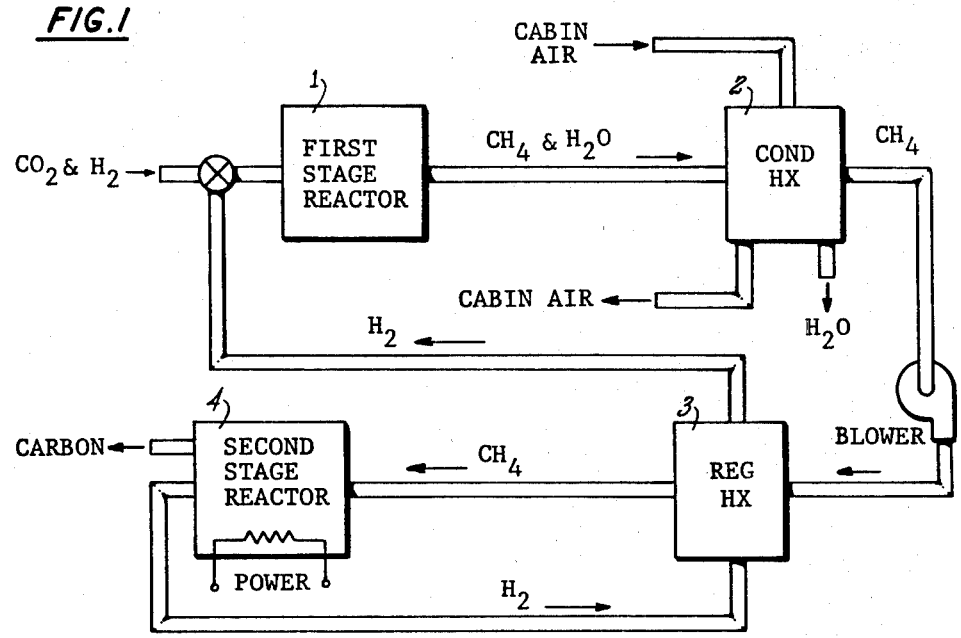
FIG. 1 shows schematically the carbon dioxide based-oxygen reclamation system according to the present invention.

The cyclic nature of the process according to the present invention can be appreciated by a closer inspection of FIG. 1. The water exiting from condenser-heat exchanger 2 is conventionally electrolyzed to produce oxygen for breathing (e.g. in space) and hydrogen for reaction with the exhaled $CO_2$. The heat exchanger also provides a means for conditioning the cabin air. Heat exchanger 3 is used to both heat the methane and cool the hydrogen, both for further reaction. Accordingly, not only is the system material efficient but heat efficient as well.

The recent testing performed on the methane composition phase of the reaction has resulted in the high density carbon forming on non-catalytic glass surfaces with nearly complete methane dissociation. This carbon can readily be peeled from the glass surface upon cooling. This provides for reduction in carbon containment volume and eliminates expendable catalyst requirements of the prior art as discussed above.

Although this invention has been shown and described with respect to detailed embodiments thereof, it will be understood by those skilled in the art that various changes in form and detail thereof may be made without departing from the spirit and scope of the claimed invention.

We claim:

1. A method of reclaiming oxygen from carbon dioxide exhaust comprising reacting the carbon dioxide with hydrogen to form a mixture of methane and water and electrolyzing the water to form hydrogen gas and oxygen, wherein the improvement comprises passing the methane produced without additives over a high temperature stable glass surface heated to a temperature of about 1000° C. to about 1200° C. to produce carbon deposits having a density greater than about 2 grams per cubic centimeter and hydrogen gas for reacting with the carbon dioxide, removing and collecting the carbon deposits produced.

2. The method of claim 1 wherein the methane flow is about 10 cubic centimeters to about 1300 cubic centimeters per minute.

3. The method of claim 1 wherein the glass is in the form of tubes or rods.

4. The method of claim 1 wherein heating is supplied by means of resistance furnace heating.

5. The method of claim 1 wherein the flow is substantially laminar flow.

* * * * *